United States Patent [19]
Leverenz

[11] Patent Number: 4,810,783
[45] Date of Patent: Mar. 7, 1989

[54] PROCESS FOR THE PREPARATION OF AZO DYESTUFFS HAVING AN ANILINE-TYPE COUPLER BY AMINOLYSIS OF THE APPROPRIATE ETHER GROUP-CONTAINING COMPOUNDS

[75] Inventor: Klaus Leverenz, Leverkusen, Fed. Rep. of Germany

[73] Assignee: Bayer Aktiengesellschaft, Leverkusen, Fed. Rep. of Germany

[21] Appl. No.: 21,285

[22] Filed: Mar. 3, 1987

[30] Foreign Application Priority Data

Mar. 20, 1986 [DE] Fed. Rep. of Germany ....... 3609342

[51] Int. Cl.⁴ ................ C09B 29/045; C09B 29/26; C09B 43/44; D06P 3/54
[52] U.S. Cl. ............................ 534/588; 534/573; 534/732; 534/733; 534/753; 534/761; 534/777; 534/787; 534/788; 534/791; 534/794; 534/795; 534/804; 534/844; 534/847; 534/850; 534/857; 534/859; 534/887
[58] Field of Search ............... 534/588, 788, 752, 753, 534/769

[56] References Cited

U.S. PATENT DOCUMENTS 3,102,878  9/1963  Baumann et al. ............ 534/788 X
3,405,118 10/1968  Sartori ......................... 534/788
4,052,379 10/1977  Fourley ...................... 534/788 X
4,465,628  8/1984  Grund et al. ................ 534/788

FOREIGN PATENT DOCUMENTS 44-13389  6/1969  Japan ........................... 534/788
61-141765 6/1986  Japan ........................... 534/788

OTHER PUBLICATIONS

Markert, Chemical Abstracts, vol. 84, #121420e (1976).

Primary Examiner—Floyd D. Higel
Attorney, Agent, or Firm—Sprung Horn Kramer & Woods

[57] ABSTRACT

An azo dyestuff of the formula

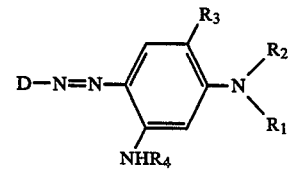

wherein
D = a diazo component,
$R_1$ and $R_2$ = alkyl or aralkyl,
$R_3$ = H, R or $OR_1$ and
$R_4$ = a hydrocarbon radical or acyl, which are prepared in a simple manner by aminolysis with ammonia or an amine of the formula

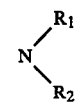

of an azo compound of the formula

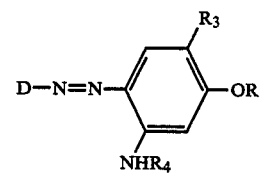

these dyestuffs dye polyester fibres in blue-green to green shades with good fastness to light.

6 Claims, No Drawings

PROCESS FOR THE PREPARATION OF AZO DYESTUFFS HAVING AN ANILINE-TYPE COUPLER BY AMINOLYSIS OF THE APPROPRIATE ETHER GROUP-CONTAINING COMPOUNDS

The invention relates to a process for the preparation of non-ionic azo dyestuffs of the formula

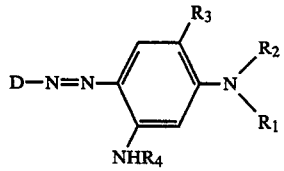

wherein
D represents the radical of a diazo component which conains at least one non-ionic electron-withdrawing substituent,
$R_1$ and $R_2$ independently of one another denote hydrogen or an optionally substituted alkyl or aralkyl radical, or—together—denote an alkylene group,
$R_3$ denotes hydrogen, $OR_1$ or $R_1$ and
$R_4$ denotes hydrogen or an alkyl, aralkyl, aryl, hetaryl or acyl radical.

The compounds of the formula I are known in most cases and are useful disperse dyestuffs.

Suitable diazo components D are both aromatic and heteroaromatic radicals, in particular those of the benzene, naphthalene, thiophene, thiazole, thiadaizole, benzothiazole, benzisothiazole and pyrazole series.

Suitable electron-withdrawing substituents are $CF_3$, alkylsulphonyl, arylazo, acyl, CN and, above all, $NO_2$.

Suitable acyl radicals are radicals of the formulae —$COR_1$, —$COOR_1$, —$CONH_2$, —$CONHR_1$, —$CONR_1R_2$, —COH and —$COR_3$, $R_3$ denoting aryl or hetaryl.

Suitable alkyl radicals $R_1/R_2$ are, for example, those with 1-6 C atoms which are optionally substituted by OH or $C_1$-$C_4$-alkoxy.

Suitable aryl radicals $R_1$-$R_3$ and X, inter alia, are phenyl radicals, which can be substituted by $CF_3$, halogen, $C_1$-$C_4$-alkyl or $C_1$-$C_4$-alkoxy.

Suitable aralkyl radicals are phenyl-$C_1$-$C_3$-alkyl radicals, which can be substituted in the phenyl radical as described above.

Suitable alkylene groups $R_1+R_2$ are —$(CH_2)_n$(n-=4-5).

Suitable halogen atoms are F and, above all, Br and Cl.

The compounds I are usually obtained by a process in which amines of the formula D—$NH_2$ are diazotized and the diazotization products are coupled with anilines of the formula

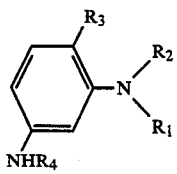

This process has the diasvantage, however, that the coupling components of the formula shown are frequently relatively difficult to obtain and/or the coupling itself does not proceed quantitatively, which results in low yields and an insufficient purity of the process products.

It has now been found that the compounds of the formula I are obtained in a more simple manner and in some cases in a better quality and yield by a process in which azo compounds of the formula

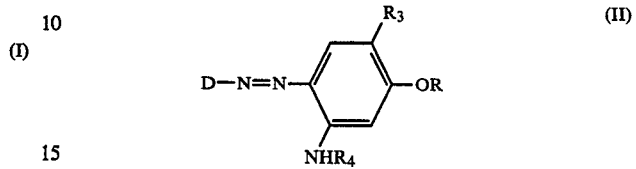

wherein
D, $R_3$ and $R_4$ have the abovementioned meaning and R represents $R_1$,
are reacted with ammonia or amines of the formula

It must be regarded as decidedly surprising that this reaction proceeds so smoothly, since such exchange reactions usually only lead to satisfactory results if the —OR substituent in the para-position is very highly activated by nitro groups in the ortho-position (compare German Pat. No. A-2,528,866) or a quaternary diazo component D (compare German Pat. Nos. A-1,137,815 and 2,908,135), and is not—as in the present case—singly or doubly deactivated by the substituent —$NHR_4$ and, where appropriate, with $R_3\neq H$.

It was also not to be excluded from the beginning that cleavage of the azo bridge takes place during aminolysis of the OR group (compare Chem. Abstr. 82, 124 931s (1975) and 89, 129 453s (1982)).

The process according to the invention can be carried out in water or organic solvents or in aqueous-organic media. The process is advantageously carried out with a stoichiometric excess of the amines III, which then at the same time assume the role of solvent. The aminolysis is in general carried out at 50°-150° C., preferably 80°-120° C., that is to say under relatively mild conditions.

The course of the reaction and the end of the reaction can easily be monitored or determined by thin layer chromatography.

Preferred azo compounds II which are to be employed are:

(1) Compounds of the formula

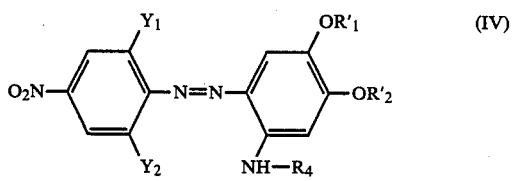

wherein
$R_4$ denotes hydrogen or an alkyl, aralkyl, aryl, hetaryl or acyl radical,
$R'_1$ denotes $C_1$-$C_4$-alkyl, $R'_2$ denotes $C_1$-$C_4$-alkyl,
$Y_1$ denotes F, Cl, Br, I, CN or $NO_2$ and
$Y_2$ denotes $Y_1$ or $CF_3$, $SO_2R'_1$, $CO_2R_1$, $COR'_1$ or $OR_1$, (2) and those of the formula

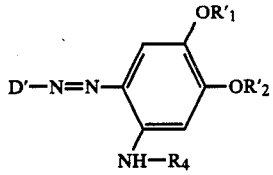

wherein
D' denotes the radical of a heterocyclic diazo component of the type mentioned above, in particular those of the formulae

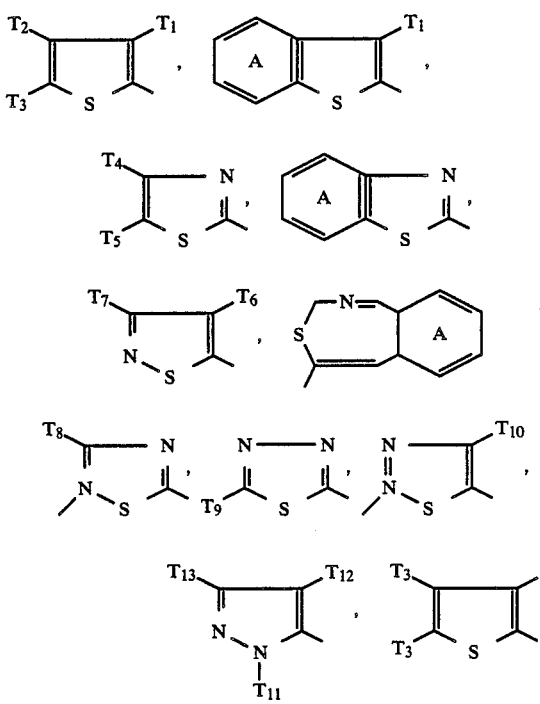

wherein
$T_1 = NO_2$, CN or $COOR_1$,
$T_2 = $ H or $CH_3$,
$T_3 = NO_2$, CN, $COOR_1$, $COR_1$, $COR_3$, $SO_2R_1$, $SO_2R_3$ or phenylazo,
$T_2 + T_3 = $—$CH_2CH_2CH_2CH_2$— or —$CH_2CH_2CH_2$—,
$T_4 = $ H, $CH_3$ or phenyl,
$T_5 = NO_2$, $COOR_1$, CN or phenylazo,
$T_6 = $ Br, $NO_2$ or CN,
$T_7 = $ H, $R_1$, $R_3$ or $SO_2R_1/R_3$,
$T_8 = $ Cl, Br, CN, phenyl or $SR_1$,
$T_9 = $ Cl, Br, $CF_3$, $SO_2R_1/R_3$ or $SR_1$,
$T_{10} = R_1$, $R_3$, Cl, Br or $COOR_1$,
$T_{11} = $ H or $R_1$,
$T_{12} = NO_2$, CN, Cl, Br, $COOR_1$ and
$T_{13} = $ H, CN or $R_1$,
and wherein
$R_1/R_3/R_4$ have the abovementioned meaning, it being possible for the rings labelled A and the phenylazo radical to be substituted by $R_1$, Cl, Br, $NO_2$, CN, $COOR_1$, SCN or $SO_2R_1$.

The compounds of the formulae II, IV and V are known only in an individual case (compare German Patent Specification Nos. 643,058 and 744,215 and U.S. Pat. No. 2,870,137), but are in all cases readily accessible by methods which are known per se.

Compounds of the stated formulae from the benzisothiazole series are especially preferred.

Examples which may be mentioned of compounds of the formula III are: methylamine, ethylamine, chloroethylamine, hydroxyethylamine, butylamine, hexylamine, isopropylamine, 3-methyl-butanamine, allylamine, stearylamine, diethylamine, dipropylamine, dibutylamine, 2-ethyl-hexylamine, ditridecylamine, N-ethylisoprylamine, N-methylisobutylamine, N-methylstearylamine, 2-ethoxyethylamine, diallylamine, di-2-methoxyethylamine, 3-ethylaminopropionitrile, N-ethyl-butylamine, 3-methoxypropylamine, 3-ethoxy-propylamine, 3-butoxypropylamine, 3-(2-ethoxyhexoxy)-propylamine, diethanolamine, isopropanolamine, diisopropanolamine, 2-(2-amino-ethoxy)ethanol, 2-propylaminoethanol, 2-butylaminoethanol, cyclopropane-amine, cyclohexane-amine, N-ethyl-cyclohexane-amine, benzylamine, 2-phenylethylamine, 2-methoxyphenylethylamine, 4-methoxyphenylethylamine, 3,4-dimethoxyphenylethylamine, 4-hydroxyphenylethylamine, 2-diethylaminoethylamine, 3-dimethylaminopropylamine, N-methyl-1,3-propanediamine, diethylenetriamine, aniline, 4-methoxyaniline, 3-chloroaniline, 4-dimethylamino-aniline, 3,4-dimethoxyaniline, p-toluidine, 3-amino-acetanilide, 1-aminonaphthalene, pyrrolidine, piperidine, piperazine, N-(2-hydroxyethyl)piperazine, N-(2-aminoethyl)piperazine, 4-methylpiperidine, morpholine, 2-aminomethyl-furan, hexamethyleneimine, imidazole, butyl 3-butylamino-propionate, dimethyl 2-butylamino-ethanephosphate, 3-butylaminopropionitrile, 2-methylaminoethanesulphonic acid, 3-aminopropionic acid and 3-amino-tetramethylene sulphone.

Possible solvents for the aminolysis are: water, amines employed in excess and alcohols, such as methanol, ethanol, propanol, isopropanol, n- or iso-butanol, glycol, glycol ethers, such as 2-methoxy-ethanol, 2-ethoxyethanol, 2-isopropoxy-ethanol, 2-butoxyethanol, diethylene glycol, diethylene glycol dimethyl ether, diethylene glycol diethyl ether and propylene glycol monoethyl ether, dioxane, esters, such as methyl glycol acetate and propylene glycol monomethyl ether-acetate, amides, such as formamide, dimethylformamide, dimethylacetamide, N-methyl-pyrrolidone and tetramethylurea, nitriles, such as acetonitrile, 2-hydroxy-propionitrile and 2-methoxy-propionitrile, sulphones, such as dimethyl sulphone and tetramethylene sulphone, dimethylsulphoxide and (het)aromatic compounds, such as toluene, xylene, chlorobenzene, dichlorobenzene, nitrobenzene, pyridine, picoline or quinoline.

The solvents can also be employed as a mixture with one another.

In the examples which follow, "parts" denote parts by weight.

Dyestuffs of the formula

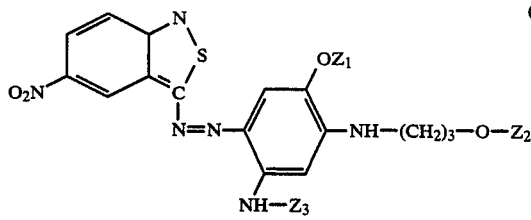

wherein
Z$_1$=C$_1$-C$_4$-alkyl,
Z$_2$=C$_1$-C$_4$-alkyl,
Z$_3$=H, Z$_4$,

—SO$_2$—Z$_4$ or

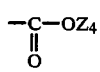

and
Z$_4$=C$_1$-C$_4$-alkyl,
are new and therefore the invention likewise relates to them.

They dye polyester fibres in blue-green to green shades with good fastness to light.

Particularly preferred dyestuffs are those of the formula (IV) wherein:
Z$_1$=C$_1$-C$_2$-alkyl
Z$_2$=CH$_3$, C$_2$H$_5$ or n—C$_4$H$_9$ and
Z$_3$=COCH$_3$,
and mixtures of these dyestuffs which differ in respect of the definition of Z$_2$.

EXAMPLE 1

5.5 parts of the dyestuff of the formula

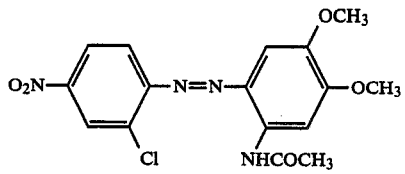

(prepared according to German Reichspatent No. 744,215) are heated at 100° C. in a mixture of 50 parts of dimethylformamide and 10 parts of pyridine with 5 parts of 2-methoxyethylamine for 75 minutes. After the mixture has cooled to 80° C., 50 parts of methanol are added and the dyestuff formed, of the formula

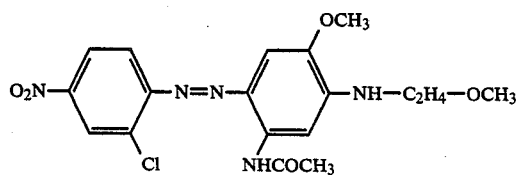

is filtered off, after cooling; yield: 5 parts. It dyes polyethylene terephthalate fibres in red-violet; shades and is characterized by a λ$_{max}$ value of 560 nm at a molar extinction $\epsilon_{\lambda max}$ of 40,800 [l/mol-cm], measured in dimethylformamide.

EXAMPLE 2

5.5 parts of the dyestuff of the formula

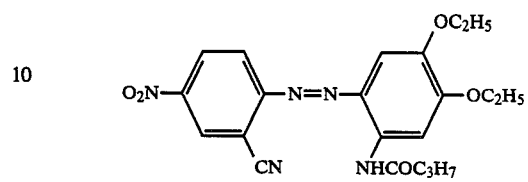

(prepared by coupling diazotized 2-amino-5-nitro-benzonitrile to 3,4-dimethoxy-butyric acid anilide) are heated at 100° C. in 50 parts of N-methylpyrrolidone with the addition of 3 parts of p-anisidine for 20 hours, with stirring. After addition of 50 parts of methanol, 6 parts of the dyestuff of the formula

are isolated, after cooling. It dyes polyester fibres in reddish-tinged blue shades which are fast to light and sublimation. λ$_{max}$: 600 nm; $\epsilon_{\lambda max}$ 45,415 (dimethylformamide).

EXAMPLE 3

6.8 parts of the dyestuff of the formula

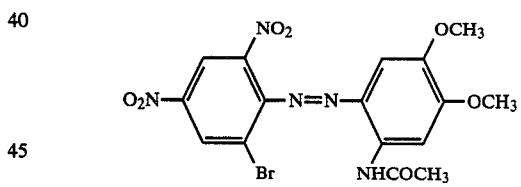

(prepared from diazotized 2-bromo-4,6-dinitro-aniline and 3,4-dimethoxy-acetanilide) are heated at 100° C. in 50 parts of dimethylacetamide with 5 parts of ethyl-3,6,9-trioxadecylamine for 3 hours. After cooling, the dyestuff formed is precipitated with 100 parts of water. It probably has the following structure

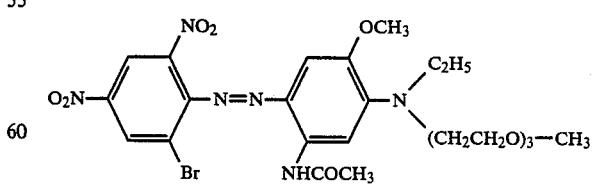

and dyes polyester in navy blue shades; λ$_{max}$: 608 nm, $\epsilon_{\lambda max}$: 34,420 (dimethylformamide).

EXAMPLE 4

67 parts of the dyestuff of the formula

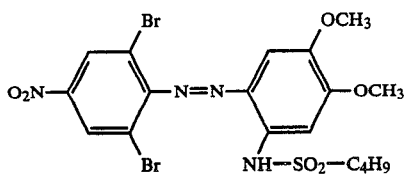

(prepared from diazotized 2,6-bromo-4-dinitro-aniline and N-[3,4-dimethoxyphenyl]-butanesulphonic acid amide) are warmed at 100° C. in 80 parts of dimethylformamide with 14 parts of zinc cyanide, 2 parts of copper(I) cyanide and 30 parts of 4-ethoxy-aniline. After cooling and addition of 200 parts of methanol, 52 parts of the reaction product of the formula

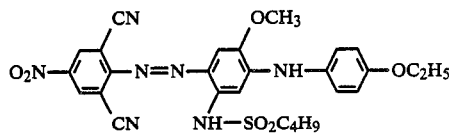

are isolated. The dyestuff dyes polyester fibres in greenish-tinged blue shades with good fastness to light and sublimation.

$\lambda_{max}$ 592 nm; $\epsilon_{\lambda max}$: 66,900 (dimethylformamide).

The dyestuffs of the formula

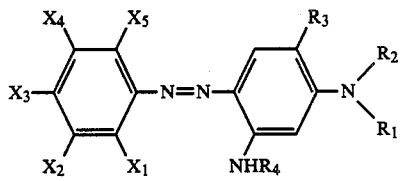

according to the following Table 1 are obtained in an analogous manner starting from corresponding azo compounds of the formula II (wherein R=CH₃ or CH(CH₃)₂):

TABLE 1

| Example No. | $X_1$ | $X_2$ | $X_3$ | $X_4$ | $X_5$ | $R_3$ | $R_1$ | $R_2$ | $R_4$ | Solvent | Temp. (°C.) | $\lambda$max (nm) in DMF |
|---|---|---|---|---|---|---|---|---|---|---|---|---|
| 5 | Cl | H | $NO_2$ | H | H | $-CH(CH_3)_2$ | H | $-CH_2-CH_2CH_2CH_2-$ | $-COCH_3$ | DMF/Pyridine | 25 | 588 |
| 6 | Cl | H | $NO_2$ | H | H | $-CH(CH_3)_2$ | H | $-(CH_2)_3-OCH_3$ | $-COCH_3$ | DMF/Pyridine | 80 | 564 |
| 7 | Cl | H | $NO_2$ | H | H | $OCH_3$ | H | $-C_4H_9$ | $-COCH_3$ | DMF/Pyridine | 100 | 568 |
| 8 | Br | H | $NO_2$ | H | H | $OCH_3$ | H | $-C_6H_{11}$ | $-COCH_3$ | DMF/Pyridine | 100 | 565 |
| 9 | $NO_2$ | H | $NO_2$ | H | H | $OCH_3$ | | $-CH_2-CH_2-C_6H_5$ | $-COCH_3$ | DMF | 80 | 607 |
| 10 | $NO_2$ | H | $NO_2$ | H | Br | $OCH_3$ | $-CH_3$ | $-CH_2-CH_2-CH_2-$ | $-COC_2H_5$ | DMF | 80 | 574 |
| 11 | $NO_2$ | H | $NO_2$ | H | Br | $OCH_3$ | $-C_2H_5$ | $-C_3H_7$ | $-COC_2H_4-OCH_3$ | N—Methylpyrrolidine | 25 | 598 |
| 12 | $NO_2$ | H | $NO_2$ | H | Br | $OCH_3$ | $-C_2H_5$ | $-C_4H_9$ | $-SO_2-CH_3$ | N—Methylpyrrolidine | 25 | 600 |
| 13 | $NO_2$ | H | $NO_2$ | H | Br | $OCH_3$ | $-C_2H_5$ | $-C_3H_7$ | $-SO_2-C_4H_9$ | N—Methylpyrrolidine | 25 | 582 |
| 14 | $NO_2$ | H | $NO_2$ | H | Br | $OCH_3$ | $-(CH_2)_6-$ | | $-SO_2C_6H_5$ | N—Methylpyrrolidine | 25 | 618 |
| 15 | $NO_2$ | H | $NO_2$ | H | Br | $OCH_3$ | $CH_3$ | $-C_{18}H_{37}$ | $-COCH_3$ | Dimethylacetamide | 80 | 610 |
| 16 | $NO_2$ | H | $NO_2$ | H | Br | $OCH_3$ | $-C_4H_9$ | $-C_2H_4P(OCH_3)_2$ | $-COCH_3$ | DMF/Pyridine | 100 | |
| 17 | $NO_2$ | H | $NO_2$ | H | Br | $OCH_3$ | $-C_4H_9$ | $-C_2H_4COOC(CH_3)_3$ | $-COCH_3$ | DMF/Pyridine | 100 | 618 |
| 18 | $NO_2$ | H | $NO_2$ | H | H | $OCH_3$ | H | $-C_8H_{17}$ | $-COC_3H_7$ | DMF/Pyridine | 80 | 590 |
| 19 | CN | H | $NO_2$ | H | Br | $OCH_3$ | H | $-(CH_2)_3OC_3H_7$ | $-COC_2H_4OC_2H_5$ | DMF | 80 | 602 |
| 20 | CN | H | $NO_2$ | H | Br | $OCH_3$ | H | $-C_4H_9$ | $-COC_2H_4OC_2H_5$ | DMF | 80 | 628 |
| 21 | CN | H | $NO_2$ | H | Br | $OCH_3$ | H | $-CH_2C_6H_5$ | $COC_2H_4OCH_3$ | DMF | 25 | 628 |
| 22 | CN | H | $NO_2$ | H | Br | $OCH_3$ | $CH_3$ | | $COC_2H_4OCH_3$ | DMF | 60 | |
| 23 | CN | H | $NO_2$ | H | Br | $OCH_3$ | H | $-CH_2-CH\begin{smallmatrix}CH_2-CH_2\\ \phantom{-}\\O-CH_2\end{smallmatrix}$ | $COC_2H_4OCH_3$ | DMF | 25 | 610 |
| 24 | CN | H | $NO_2$ | H | Br | $OCH_3$ | H | $-C_2H_4OCH_3$ | $COC_2H_4OCH_3$ | DMF | 60 | 618 |
| 25 | CN | H | $NO_2$ | H | Br | $OCH_3$ | H | $-CH_2-CH-C_4H_9$ $\phantom{xxxxx}|$ $\phantom{xxxxxxxx}C_2H_5$ | $COCH_3$ | DMF/Pyridine | 140 | 629 |
| 26 | CN | H | $NO_2$ | H | Br | $OCH_3$ | $CH_3$ | $-(CH_2)_6-$ | $COCH_3$ | DMF/Pyridine | 25 | 643 |
| 27 | Br | H | $NO_2$ | H | $NO_2$ | H | $C_2H_5$ | $C_2H_5$ | $COCH_3$ | DMF/Pyridine | 25 | 563 |
| 28 | CN | H | $NO_2$ | H | $NO_2$ | H | $C_4H_9$ | $C_3H_7$ | $COC_3H_7$ | DMF/Pyridine | 25 | 604 |
| 29 | CN | H | $NO_2$ | H | $NO_2$ | $OCH_3$ | H | $C_4H_9$ | $COCH_3$ | DMF/Pyridine | 25 | 642 |
| 30 | CN | H | $NO_2$ | H | CN | $OCH_3$ | H | $-C_6H_4-N(CH_3)_2(p)$ | $-SO_2-C_4H_9$ | DMF | 40 | 616 |
| 31 | CN | H | $NO_2$ | H | CN | $OCH_3$ | H | $-C_6H_4-NHCOCH_3(m)$ | $-SO_2-C_4H_9$ | DMF | 60 | 584 |
| 32 | CN | H | $NO_2$ | H | CN | $OCH_3$ | H | $-C_6H_4-Cl(p)$ | $-SO_2-C_4H_9$ | DMF | 85 | 586 |
| 33 | CN | H | $NO_2$ | H | CN | $OCH_3$ | H | $-C_6H_4-CH_3(o)$ | $-SO_2-C_4H_9$ | DMF | 85 | 576 |
| 34 | CN | H | $NO_2$ | H | CN | $OCH_3$ | H | $-C_{10}H_7(\alpha)$ | $-SO_2-C_4H_9$ | DMF | 60 | 584 |
| 35 | CN | H | $NO_2$ | H | CN | $OCH_3$ | H | $-C_6H_5$ | $-SO_2-C_4H_9$ | DMF | 60 | 584 |
| 36 | CN | H | $NO_2$ | H | CN | $OCH_3$ | $-C_2H_4OCH_3$ | $-C_2H_4OCH_3$ | $-SO_2CH_3$ | DMF | 45 | 636 |
| 37 | CN | H | $NO_2$ | H | CN | $OCH_3$ | $-C_2H_5$ | $-C_3H_7$ | $-SO_2C_6H_5$ | DMF | 25 | 640 |
| 38 | CN | H | $NO_2$ | H | CN | $OCH_3$ | $-C_2H_5$ | $-C_4H_9$ | $-COC_6H_4-CH_{3(m)}$ | DMF | 50 | 646 |
| 39 | CN | H | $NO_2$ | H | CN | $OCH_3$ | $-C_4H_9$ | $-C_4H_9$ | $-COOC_2H_5$ | N—Methylpyrrolidone | 25 | 640 |
| 40 | CN | H | $NO_2$ | H | CN | $OCH_3$ | $-C_2H_5$ | $-C_3H_7$ | $-COC_3H_7$ | N—Methylpyrrolidone | 80 | 640 |

EXAMPLE 41

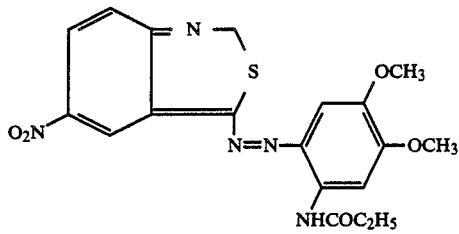

(prepared from diazotized 3-amino-5-nitro-benzisothiazole (2.1) N-(3,4-dimethoxyphenyl)-propionic acid amide) are heated at 80° C. in 100 ml of dimethylformamide with 10 parts of N-ethyl-propylamine for 2 hours, with stirring. After addition of 200 ml of methanol and cooling, 10 parts of the dyestuff of the formula

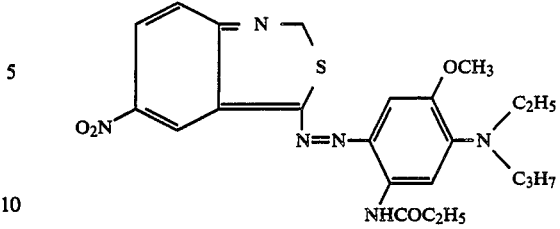

are isolated. It dyes polyester materials in bluish-tinged green shades with good fastness to light; $\lambda_{max}$: 665 nm (dimethylformamide).

The dyestuffs of the formula

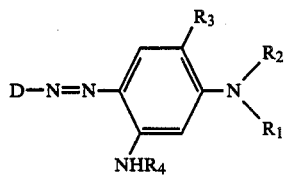

listed in Table 2 were obtained from the dyestuffs $$D-N=N- \text{[aryl]} -OR \quad (R = CH_3, C_2H_5 \text{ or } CH(CH_3)_2)$$

TABLE 2

| Example No. | D | R₃ | R₁ | R₂ | R₄ | Solvent | Temp. in (°C.) | $\lambda_{max}$ (DMF) in nm |
|---|---|---|---|---|---|---|---|---|
| 42 | 4-O₂N-benzothiazole | OCH₃ | —C₂H₅ | —C₂H₅ | —COCH₃ | N—Methylpyrrolidone | 50 | 668 |
| 43 | 4-O₂N-benzothiazole | OCH₃ | CH₃ | —C₂H₄OH | —COCH₃ | N—Methylpyrrolidone | 80 | 662 |
| 44 | 4-O₂N-benzothiazole | OCH₃ | —C₂H₅ | —C₃H₇ | —COC₃H₇ | N—Methylpyrrolidone | 80 | 669 |
| 45 | 4-O₂N-benzothiazole | OCH₃ | —C₄H₉ | —C₄H₉ | —COC₃H₇ | N—Methylpyrrolidone | 80 | 672 |
| 46 | 4-O₂N-benzothiazole | OCH₃ | —CH₃ | —C₁₈H₃₇ | —COCH₃ | Dimethylformamide | 80 | 666 |
| 47 | 4-O₂N-benzothiazole | OCH₃ | —C₂H₄OH | —C₂H₄OH | —COCH₃ | Dimethylformamide | 100 | 668 |

TABLE 2-continued

| Example No. | D | R₃ | R₁ | R₂ | R₄ | Solvent | Temp. in (°C.) | λ_max (DMF) in nm |
|---|---|---|---|---|---|---|---|---|
| 48 | [4-O₂N-benzothiazol-2-yl] | OCH₃ | —C₂H₄ | O—C₂H₄— | —COCH₃ | Dimethylformamide | 90 | 628 |
| 49 | [4-O₂N-benzothiazol-2-yl] | OCH₃ | —(CH₂)₄— | O—C₂H₄— | —COCH₃ | Dimethylformamide | 25 | 680 |
| 50 | [4-O₂N-benzothiazol-2-yl] | OCH₃ | H | —(CH₂)₃—N(CH₃)₂ | —COCH₃ | Dimethylformamide | 80 | 656 |
| 51 | [4-O₂N-benzothiazol-2-yl] | OCH₃ | H | —C₂H₄OCH₃ | COC₂H₅ | Dimethylformamide | 70 | 649 |
| 52 | [4-O₂N-benzothiazol-2-yl] | OCH₃ | H | —C₄H₉ | COC₂H₅ | Dimethylsulphoxide | 80 | 654 |
| 53 | [4-O₂N-benzothiazol-2-yl] | OCH₃ | H | —(C₂H₄O)₄CH₃ | —COCH₃ | Dimethylformamide | 80 | 652 |

TABLE 2-continued

| Example No. | D | R₃ | R₁ | R₂ | R₄ | Solvent | Temp. in (°C.) | $\lambda_{max}$ (DMF) in nm |
|---|---|---|---|---|---|---|---|---|
| 54 | (4-nitrobenzothiazole) | OCH₃ | H | —C(CH₃)₃ | —COCH₃ | Dimethylformamide | 90 | 646 |
| 55 | (4-nitrobenzothiazole) | OCH₃ | H | —CH₂—CH(CH₂—CH₂)(CH₂—OCH₂) (dioxane ring) | —COCH₃ | Dimethylformamide | 80 | 646 |
| 56 | (4-nitrobenzothiazole) | OCH₃ | H | —(CH₂)₃—OC₄H₉ | —COCH₃ | Water | 80 | 654 |
| 57 | (4-nitrobenzothiazole) | OCH₃ | H | —(CH₂)₃—OCH₃ | —COCH₃ | Dimethylformamide | 60 | 652 |
| 58 | (4-nitrobenzothiazole) | OCH₃ | H | —(CH₂)₃—OC₂H₅ | —COCH₃ | Dimethylformamide | 60 | 657 |
| 59 | (4-nitrobenzothiazole) | OCH₃ | H | —(CH₂)₃—OCH(CH₃)₂ | —COCH₃ | Water | 80 | 654 |

TABLE 2-continued

| Example No. | D | $R_3$ | $R_1$ | $R_2$ | $R_4$ | Solvent | Temp. in (°C.) | $\lambda_{max}$ (DMF) in nm |
|---|---|---|---|---|---|---|---|---|
| 60 | $O_2N$-benzothiazole | $OCH(CH_3)_2$ | H | $-(CH_2)_3COOH$ | $-COC_2H_5$ | DMF | 80 | 650 (i) |
| 61 | $O_2N$-benzothiazole | $OCH(CH_3)_2$ | H | $-C_2H_4-SO_3H$ | $-COC_2H_5$ | N—Methylpyrrolidone | 80 | 668 |
| 62 | $O_2N$-benzothiazole | $-OCH_3$ | $CH_3$ | $-C_2H_4-SO_3H$ | $-CONH_2$ | DMF | 80 | |
| 63 | $O_2N$-benzothiazole | $-OC_2H_5$ | $-C_2H_5$ | $-C_3H_7$ | $-SO_2C_4H_9$ | Tetramethylenesulphone | 80 | 764 (i) |
| 64 | $O_2N$-benzothiazole | $OCH_3$ | $-CH_2-CH_2-$ | $-CH_2-CH_2-$ | $-SO_2C_6H_5$ | Tetramethylsulphone | 60 | 758 |
| 65 | $O_2N$-benzothiazole | $-OCH_3$ | $-C_2H_5$ | $-C_2H_5$ | $-SO_2C_4H_9$ | DMF | 80 | 764 |

TABLE 2-continued

| Example No. | D | R$_3$ | R$_1$ | R$_2$ | R$_4$ | Solvent | Temp. in (°C.) | λ$_{max}$ (DMF) in nm |
|---|---|---|---|---|---|---|---|---|
| 66 | O$_2$N-benzothiazole | OCH(CH$_3$)$_2$ | —(CH$_2$)$_4$— | | —COCH$_3$ | DMF | 25 | 688 |
| 67 | O$_2$N-benzothiazole | OCH(CH$_3$)$_2$ | —CH$_3$ | C$_{18}$H$_{37}$ | —COCH$_3$ | Dimethylformamide | 90 | 668 |
| 68 | O$_2$N-benzothiazole | OCH(CH$_3$)$_2$ | H | —C$_{16}$H$_{33}$ | —COC$_3$H$_7$ | Dimethylformamide | 80 | 661 |
| 69 | O$_2$N-benzothiazole | OCH(CH$_3$)$_2$ | H | —CH$_2$—CH(C$_2$H$_5$)—C$_4$H$_9$ | —COC$_3$H$_7$ | Dimethylformamide | 80 | 660 |
| 70 | O$_2$N-benzothiazole | OCH$_3$ | H | —C$_6$H$_5$ | —COCH$_3$ | Dimethylformamide | 100 | 662 |
| 71 | O$_2$N-benzothiazole | OCH$_3$ | H | —C$_6$H$_4$—OCH$_3$(p) | —COCH$_3$ | Dimethylformamide | 110 | 674 |

TABLE 2-continued

| Example No. | D | R₃ | R₁ | R₂ | R₄ | Solvent | Temp. in (°C.) | $\lambda_{max}$ (DMF) in nm |
|---|---|---|---|---|---|---|---|---|
| 72 | (Br, O₂N-benzothiazole) | OCH₃ | H | —C₆H₃(OCH₃)₂(3,4) | —COCH₃ | Dimethylformamide | 110 | 680 |
| 73 | (Br, O₂N-benzothiazole) | OCH₃ | —C₂H₅ | —C₃H₇ | —COC₂H₅ | Dimethylformamide | 50 | |
| 74 | (Br, O₂N-benzothiazole) | OCH₃ | —C₂H₅ | —C₂H₅ | —SO₂C₄H₉ | Dimethylformamide | 80 | |
| 75 | (Br, O₂N-benzothiazole) | OCH₃ | —C₂H₅ | —C₂H₅ | —CONH₂ | Dimethylformamide | 80 | 671 |
| 76 | (O₂N-benzothiazole) | OCH₃ | —C₂H₅ | —C₃H₇ | —COC₄H₉ | N—Methylpyrrolidone | 80 | 625 (i) |
| 77 | (O₂N-thiazole) | OCH₃ | —C₂H₅ | —C₃H₇ | —COCH₃ | N—Methylpyrrolidone | 30 | |

TABLE 2-continued
| Example No. | D | $R_3$ | $R_1$ | $R_2$ | $R_4$ | Solvent | Temp. in (°C.) | $\lambda_{max}$ (DMF) in nm |
|---|---|---|---|---|---|---|---|---|
| 78 | 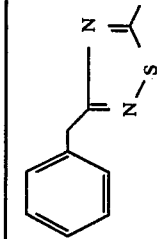 | $OCH_3$ | $-C_2H_5$ | $-C_3H_7$ | $-COCH_3$ | Dimethylformamide | 80 | 608 nm (i) |

EXAMPLE 79

258.9 parts of the dyestuff of the formula

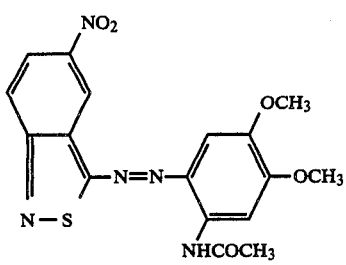

(prepared according to German Reichspatent No. 744,215) are heated at 100° C. in a solution of 22.9 parts of 3-methoxypropylamine, 26.5 parts of 3-ethoxypropylamine and 33.7 parts of n-butoxypropylamine in 600 parts of dimethylformamide for 75 minutes. After cooling to 80° C., 50 parts of methanol are added and the dyestuff formed, of the formula

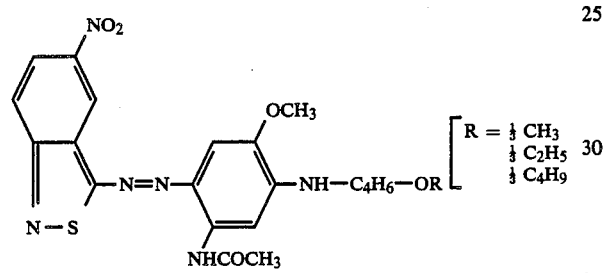

$$\left[ R = \tfrac{1}{3} CH_3, \tfrac{1}{3} C_2H_5, \tfrac{1}{3} C_4H_9 \right]$$

is filtered off, after cooling. Yield: 215.3 parts.

The dyestuff is distinguished by a good affinity for polyethylene terephthalate fibres, which are dyed in a green colour shade.

I claim:

1. A process for the preparation of a non-ionic azo dyestuff of the formula

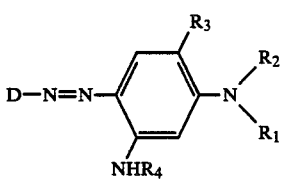

wherein
D represents the radical of a diazo component which contains at least one non-ionic electron-withdrawing substituent selected from the group consisting of $CF_3$, alkylsulphonyl, arylazo, acyl, CN and, $NO_2$, $R_1$ and $R_2$ independently of one another denote hydrogen, unsubstituted alkyl or alkyl substituted by HO or $C_1$-$C_4$-alkoxy, unsubstituted aralkyl or aralkyl substituted in the aryl portion by $OF_3$, halogen, $C_1$-$C_4$-alkyl or $C_1$-$C_4$-alkoxy, or $R_1$ and $R_2$ taken together denote a $C_4$-$C_5$-alkylene group, $R_3$ denotes hydrogen, $OR_1$ or $R_1$ and $R_4$ denotes hydrogen, alkyl, aralkyl, aryl, or acyl, wherein an azo compound of the formula

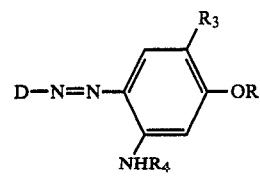

in which R represents $R_1$ is reacted with ammonia or an amine of the formula

wherein said reaction is carried out in water, an organic solvent or in aqueous-organic media at a temperature of from 50°-150° C.

2. A process according to claim 1, wherein a compound of the formula

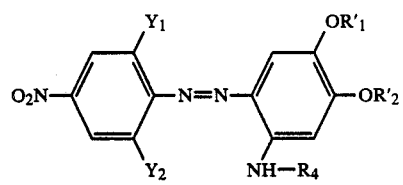

wherein
$R_4$ denotes hydrogen, alkyl, aralkyl, aryl, hetaryl or acyl,
$R'_1$ denotes $C_1$-$C_4$-alkyl,
$R'_2$ denotes $C_1$-$C_4$-alkyl,
$Y_1$ denotes F, Cl, Br, I, CN, $NO_2$ or $OR'_1$ and
$Y_2$ denotes $Y_1$ or $CF_3$, $SO_2R'_1$, $CO_2R_1$ or $COR'_1$, is reacted with ammonia or the amine.

3. A process according to claim 1, wherein a compound of the formula

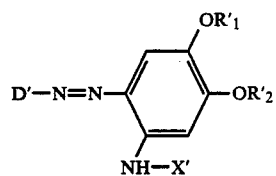

wherein
D' denotes a hetaryl of the formula

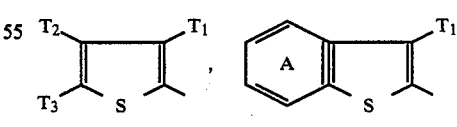

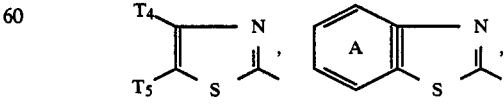

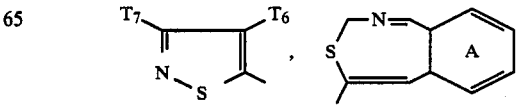

-continued

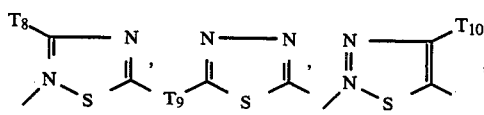

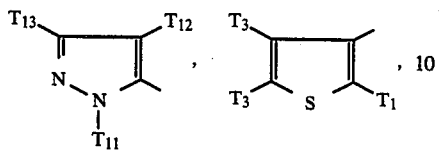

wherein
 $T_1 = NO_2$, CN or $COOR_1$,
 $T_2 = H$ or $CH_3$,
 $T_3 = NO_2$, CN, $COOR_1$, $COR_1$, $COR_3$, $SO_2R_1$, $SO_2R_3$ or phenylazo,
 $T_2 + T_3 = -CH_2CH_2CH_2CH_2-$ or $-CH_2CH_2CH_2-$,
 $T_4 = H$, $CH_3$ or phenyl,
 $T_5 = NO_2$, $COOR_1$, CN or phenylazo,
 $T_6 = Br$, $NO_2$ or CN,
 $T_7 = H$, $R_1$, $R_3$ or $SO_2R_1/R_3$,
 $T_8 = Cl$, Br, CN, phenyl or $SR_1$,
 $T_9 = Cl$, Br, $CF_3$, $SO_2R_1/R_3$ or $SR_1$,
 $T_{10} = R_1$, $R_3$, Cl, Br or $COOR_1$,
 $T_{11} = H$ or $R_1$,
 $T_{12} = NO_2$, CN, Cl, Br, $COOR_1$ and
 $T_{13} = H$, CN or $R_1$, the rings labelled A and the phenyl-azo are unsubstituted or substituted by $R_1$, Cl, Br, $NO_2$, CN, $COOR_1$, SCN or $SO_2R_1$, is reacted with ammonia or the amine.

4. A process according to claim 1, wherein the reaction is carried out at 50°–150° C.

5. A dyestuffs of the formula

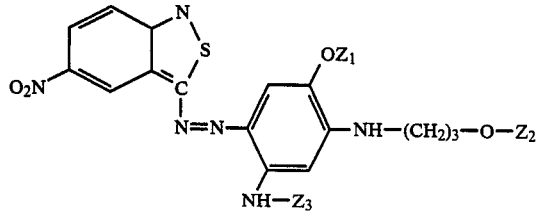

wherein
 $Z_1 = C_1-C_4$-alkyl,
 $Z_2 = C_1-C_4$-alkyl,
 $Z_3 = H$, $Z_4$, $-SO_2-Z_4$ or

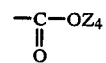

and
 $Z_4 = C_1-C_4$-alkyl.

6. Dyestuff according to claim 5, wherein
 $Z_1 = C_1-C_2$-alkyl, and
 $Z_2 = CH_3$, $C_2H_5$ or n-$C_4H_9$.

* * * * *

UNITED STATES PATENT AND TRADEMARK OFFICE
CERTIFICATE OF CORRECTION

PATENT NO. : 4,810,783

DATED : March 7, 1989

INVENTOR(S) : Klaus Leverenz

It is certified that error appears in the above-identified patent and that said Letters Patent is hereby corrected as shown below:

| | |
|---|---|
| Col. 1, line 21 | Delete "conains" and substitute --contains-- |
| Col. 1, line 32 | Delete "thiazole" second instance |
| Col. 5, line 67 | After "red-violet" delete ";" |
| Col. 9, Table 1, Example 18, under "$R^1$" | Delete "$-C_4H_{17}$" and substitute -- $-C_8H_{17}$ -- |
| Col. 19, Table 2, Example No. 64 under "Solvent" | Delete "Tetramethylsulphone" and substitute --Tetramethylenesulphone-- |

Signed and Sealed this

Sixth Day of February, 1990

Attest:

JEFFREY M. SAMUELS

Attesting Officer     Acting Commissioner of Patents and Trademarks

UNITED STATES PATENT AND TRADEMARK OFFICE
CERTIFICATE OF CORRECTION

PATENT NO. : 4,810,783

DATED : March 7, 1989

INVENTOR(S) : Klaus Leverenz

It is certified that error appears in the above-identified patent and that said Letters Patent is hereby corrected as shown below:

Col. 5, line 5 and Col. 30, line 10     Middle of formula add bonding line as follows:

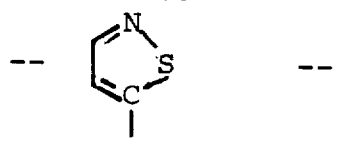

Col. 11, line 10 and Col. 12, line 5     Delete beginning of formula and substitute

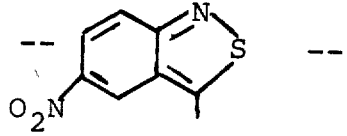

Col. 13 to 24, Example Nos. 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72 and 76     Delete formula under column D in each instance and substitute

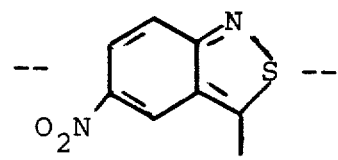

UNITED STATES PATENT AND TRADEMARK OFFICE
CERTIFICATE OF CORRECTION

PATENT NO. : 4,810,783

DATED : March 7, 1989

INVENTOR(S) : Klaus Leverenz

It is certified that error appears in the above-identified patent and that said Letters Patent is hereby corrected as shown below:

Cols. 23 and 24, Example Nos. 73, 74 and 75    Delete formula under column D in each instance and substitute

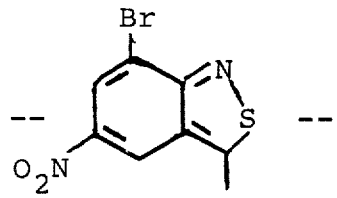

Signed and Sealed this

Twenty-second Day of May, 1990

Attest:

Attesting Officer

HARRY F. MANBECK, JR.

Commissioner of Patents and Trademarks